(12) United States Patent
Cheng

(10) Patent No.: US 6,492,908 B1
(45) Date of Patent: Dec. 10, 2002

(54) LIGHT INDICATION SHOWING FUNCTIONAL STATUS OR OPERATIONAL CONDITION THROUGH LIGHT-TRANSMISSIBLE ENCLOSURE CASE

(75) Inventor: Bruce C. H. Cheng, Taipei (TW)

(73) Assignee: Delta Electronics, Inc., Taipei (TW)

(*) Notice: Subject to any disclaimer, the term of this patent is extended or adjusted under 35 U.S.C. 154(b) by 0 days.

(21) Appl. No.: 09/413,113

(22) Filed: Oct. 6, 1999

(51) Int. Cl.[7] .................................................. G08B 5/36
(52) U.S. Cl. ........................... 340/815.73; 340/815.45; 340/815.47; 340/815.55; 340/525; 361/681; 361/679
(58) Field of Search ................. 340/815.73, 815.45, 340/815.47, 815.55, 525; 362/800; 361/681, 583, 679; 379/428, 440; 455/90

(56) References Cited

U.S. PATENT DOCUMENTS

| | | | | |
|---|---|---|---|---|
| D300,134 S | * | 3/1989 | Hervatin | D14/150 |
| 4,837,565 A | * | 6/1989 | White | 340/762 |
| 5,420,575 A | * | 5/1995 | Cheraso et al. | 340/825.44 |
| 5,557,499 A | * | 9/1996 | Reiter et al. | 361/685 |
| 5,613,873 A | * | 3/1997 | Bell, Jr. | 439/490 |
| 5,790,041 A | * | 8/1998 | Lee | 340/815.45 |
| 5,870,282 A | * | 2/1999 | Andre et al. | 361/683 |
| 5,995,012 A | * | 11/1999 | Lee et al. | 340/815.45 |
| 6,098,127 A | * | 8/2000 | Kwang | 710/62 |
| 6,133,844 A | * | 10/2000 | Ahne et al. | 340/815.45 |

* cited by examiner

Primary Examiner—Donnie L. Crosland
(74) Attorney, Agent, or Firm—Bo-In Lin

(57) ABSTRACT

The present invention discloses a personal computer that has circuit elements enclosed in a light transmissible case. The personal computer further includes a visible light enclosed in the light-transmissible case for providing indication of various functional statuses of the personal computer through the light transmissible case. In a preferred embodiment, the personal computer further includes a light controller for controlling the visible light for providing a plurality of visible light signals for indicating various functional statuses of the personal computer. In another preferred embodiment, the light controller further includes a light intensity controller for controlling an intensity of the visible light for indicating various functional statuses of the personal computer. In another preferred embodiment, the light controller further includes a light flash-pattern controller for controlling a flash-pattern of the visible light for indicating various functional statuses of the personal computer. In another preferred embodiment, the light controller further includes a color controller for controlling a color of the visible light for indicating various functional statuses of the personal computer.

36 Claims, 2 Drawing Sheets

LIGHT INDICATION SHOWING FUNCTIONAL STATUS OR OPERATIONAL CONDITION THROUGH LIGHT-TRANSMISSIBLE ENCLOSURE CASE

BACKGROUND OF THE INVENTION

1. Field of the Invention

This invention relates generally to status display and indication of electronic devices, computers and different types of data handling systems. More particularly, this invention relates to an improved status display configuration for showing the functional status or operational conditions of electronic devices or data handling systems such as a personal computer by making use of visible lights through light transmissible enclosure cases.

2. Description of the Prior Art

Due to the facts that electronic circuit elements either supported on a printed circuit board (PCB) or packaged as individual components are generally enclosed in a housing case made of non-transparent opaque materials, the operational conditions or functional statuses of these circuit elements are not directly shown. Because the enclosure case that is used for housing the circuits is not light transmissible, it is not feasible to provide visible light from the board or the components as indication signals. Typically, special light indications must be provided outside of the housing case for a user to see the operational conditions or functional statuses of a system. Electric wire connections and special lights must be designed and particularly arranged for making such indications possible. Simple examples of such indication are light indication to show the charge status of a rechargeable battery of a cellular phone or a flashing light to show an incoming voice message has been received by a phone answering machine.

However, as the data processing electronic devices, e.g., a personal digital assistant (PDA) and personal computer (PC), become more integrated with daily life, a need arises to provide more direct visible indications to inform a user of an operational condition or functional status of such devices. Furthermore, when these type of indication are not provided for the circuit elements supported on a board or formed as components, the diagnostic and repair operations of the system malfunctions become more complex and time consuming. Due to the fact that non-transparent enclosure cases are commonly employed for housing and protecting the electronic devices, the limitations as now encountered by conventional electronic devices or computers cannot be easily overcome. Therefore, as an electronic device or computer is manufactured and provided to users as "non-transparent dark box", the operational conditions or functional statuses of such device become a "black box" to most common users. Only specialists apply special diagnostic or analytical instruments can determine the operational conditions and functional statuses of the circuits supported on a PCB or packaged as electronic components.

Therefore, an improved display configuration must be provided to more directly show the operational conditions and functional statuses of the circuit elements supported on a printed circuit board or packaged as components. It is desirable that such display configuration would further provide reminder or warning signals for user to perform timely maintenance or repair functions. It is further desirable that such display configuration will provide data reception statuses to enhance network communication for Internet applications.

SUMMARY OF THE PRESENT INVENTION

It is therefore an object of the present invention to provide a novel display configuration for directly showing the operational conditions and functional statuses by visible signals transmitted from circuits on a board or components. Direct visible signals can provide additional information to aid in system diagnostic and repair operations or for upgrade and to perform upgrade or maintenance functions. Light transmissible housing cases are employed and indication lights are implemented to provide these functions such that the aforementioned limitations and difficulties encountered in the prior art can be overcome.

Specifically, it is an object of the present invention to provide a novel display configuration for directly showing the board level and component operational conditions and functional statuses. Light transmissible cases are employed and indication light signals for showing conditions and statuses are implemented such that a user is provided with more direct information related to the situations of the entire system.

Another object of the present invention is to provide a novel display configuration for directly showing the operational conditions and functional statuses of a networked computer. Light transmissible cases are employed and indication light signals for showing conditions and statuses of data transmission and reception are implemented such that a user is provided with more direct information related to the situations of the networked computers.

Another object of the present invention is to provide a novel display configuration for directly showing the operational conditions and functional statuses of electronic devices. Light transmissible cases are employed and indication light signals for showing conditions and statuses are disposed on circuit elements of the electronic device inside the light transmissible cases such that a user is provided with more direct information related to the situations of the electronic device.

Briefly, in a preferred embodiment, the present invention discloses a personal computer with circuit elements enclosed in a light transmissible case. The personal computer further includes a visible light enclosed in the light-transmissible case for providing indication of various functional statuses of the personal computer through the light transmissible case. In a preferred embodiment, the personal computer further includes a light control means for controlling the visible light for providing a plurality of visible light signals for indicating various functional statuses of the personal computer. In another preferred embodiment, the light control means further includes a light intensity control means for controlling an intensity of the visible light for indicating various functional statuses of the personal computer. In another preferred embodiment, the light control means further includes a light flash-pattern control means for controlling a flash-pattern of the visible light for indicating various functional statuses of the personal computer. In another preferred embodiment, the light control means further includes a color control means for controlling a color of the visible light for indicating various functional statuses of the personal computer. In another preferred embodiment, the personal computer further includes a printed circuit board (PCB) for supporting the circuit elements enclosed in the light-transmissible case and the visible light is disposed on the PCB for providing indication of various functional statuses of the personal computer through the light transmissible case. In another preferred embodiment, the personal computer further includes a packaged electronic component enclosed in the light-transmissible case and the visible light is disposed on the packaged electronic component for providing indication of various functional statuses of the personal computer through the light transmissible case.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
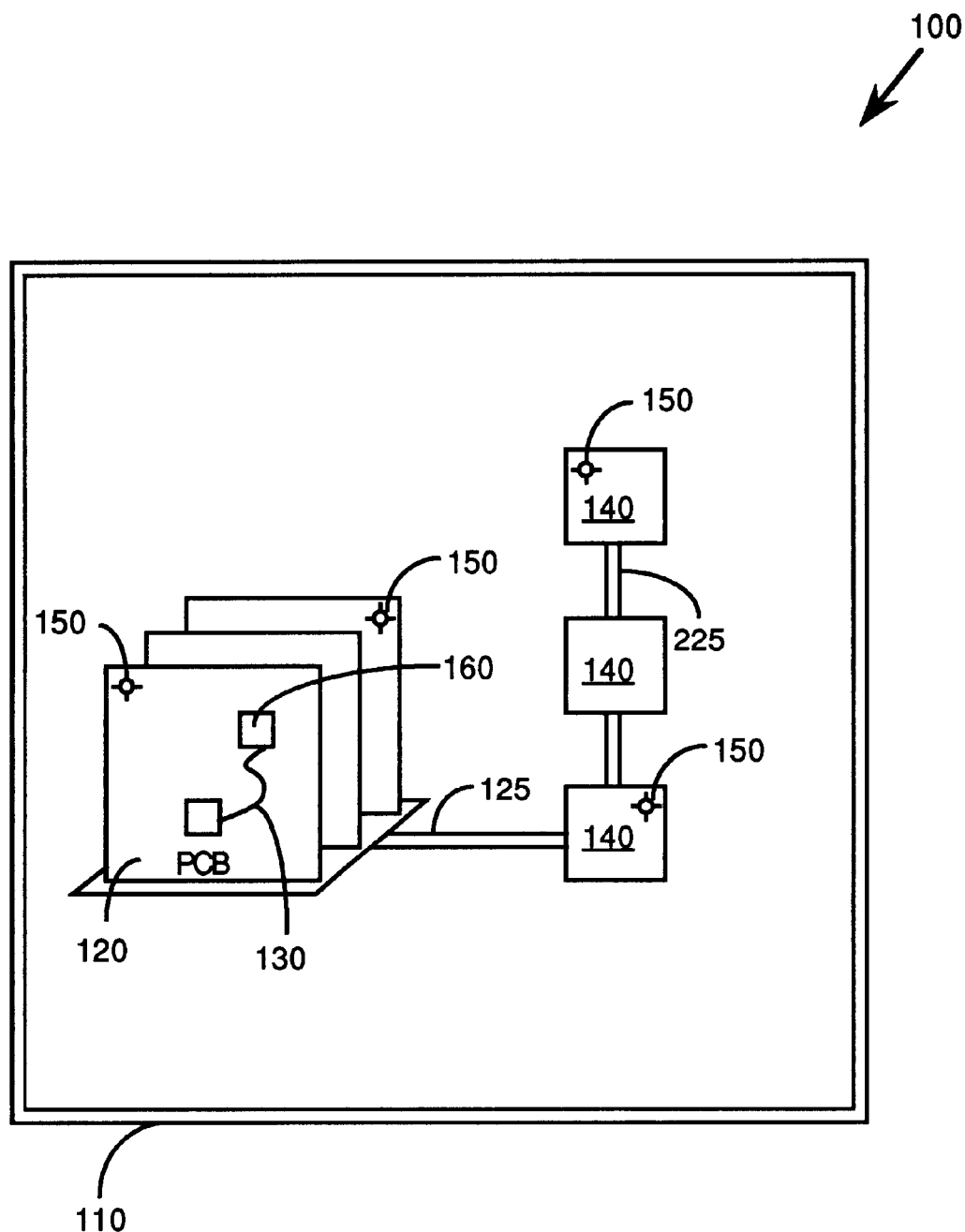
FIG. 1 is a functional block diagram showing the perspective view of a personal computer enclosed in a light transmissible case of this invention for providing an improved display configuration of operational conditions and function statuses.

FIG. 1 is a functional block diagram showing the perspective view of a personal computer 100 enclosed in a light transmissible case 110 of this invention for providing an improved display configuration of operational conditions and function statuses. The personal computer 100 has a plurality of slots for inserting a plurality printed circuit boards 120 and data and signal buses 125 and electric wires 130 connected between circuit elements supported on the PCBs 120 and packaged electronic components 140. The personal computer 100 further includes a plurality of lights 150 connected to electric elements on the printed circuit board 120 and to circuit elements of the packaged electric components 140. The lights 150 provide visible light emission as indications of the operational conditions or functional statuses of the personal computer 100 related to functions performed by the circuit elements supported on the PCB 120 or packaged into the packaged electronic components 140. The personal computer 100 further includes a light controller for controlling the intensity, the patterns of flashing and the color of the visible lights 150.

According to FIG. 1 and above description, this invention discloses a personal computer 100 having circuit elements enclosed in a light transmissible case 110. The personal computer 100 further includes a visible light 150 enclosed in the light-transmissible case 110 for providing indication of various functional statuses of the personal computer through the light transmissible case 110. In a preferred embodiment, the personal computer further includes a light control means 160 for controlling the visible light for providing a plurality of visible light signals for indicating various functional statuses of the personal computer. In another preferred embodiment, the light control means further includes a light intensity control means for controlling an intensity of the visible light for indicating various functional statuses of the personal computer. In another preferred embodiment, the light control means further includes a light flash-pattern control means for controlling a flash-pattern of the visible light for indicating various functional statuses of the personal computer. In another preferred embodiment, the light control means further includes a color control means for controlling a color of the visible light for indicating various functional statuses of the personal computer. In another preferred embodiment, the personal computer 100 further includes a printed circuit board (PCB) 120 for supporting the circuit elements enclosed in the light-transmissible case 110. And, the visible light 150 is disposed on the PCB 120 for providing indication of various functional statuses of the personal computer through the light transmissible case 110. In another preferred embodiment, the personal computer further includes a packaged electronic component 140 enclosed in the light-transmissible case 110. And, the visible light 150 is disposed on the packaged electronic component 140 for providing indication of various functional statuses of the personal computer 100 through the light transmissible case 150.

Figure 2:
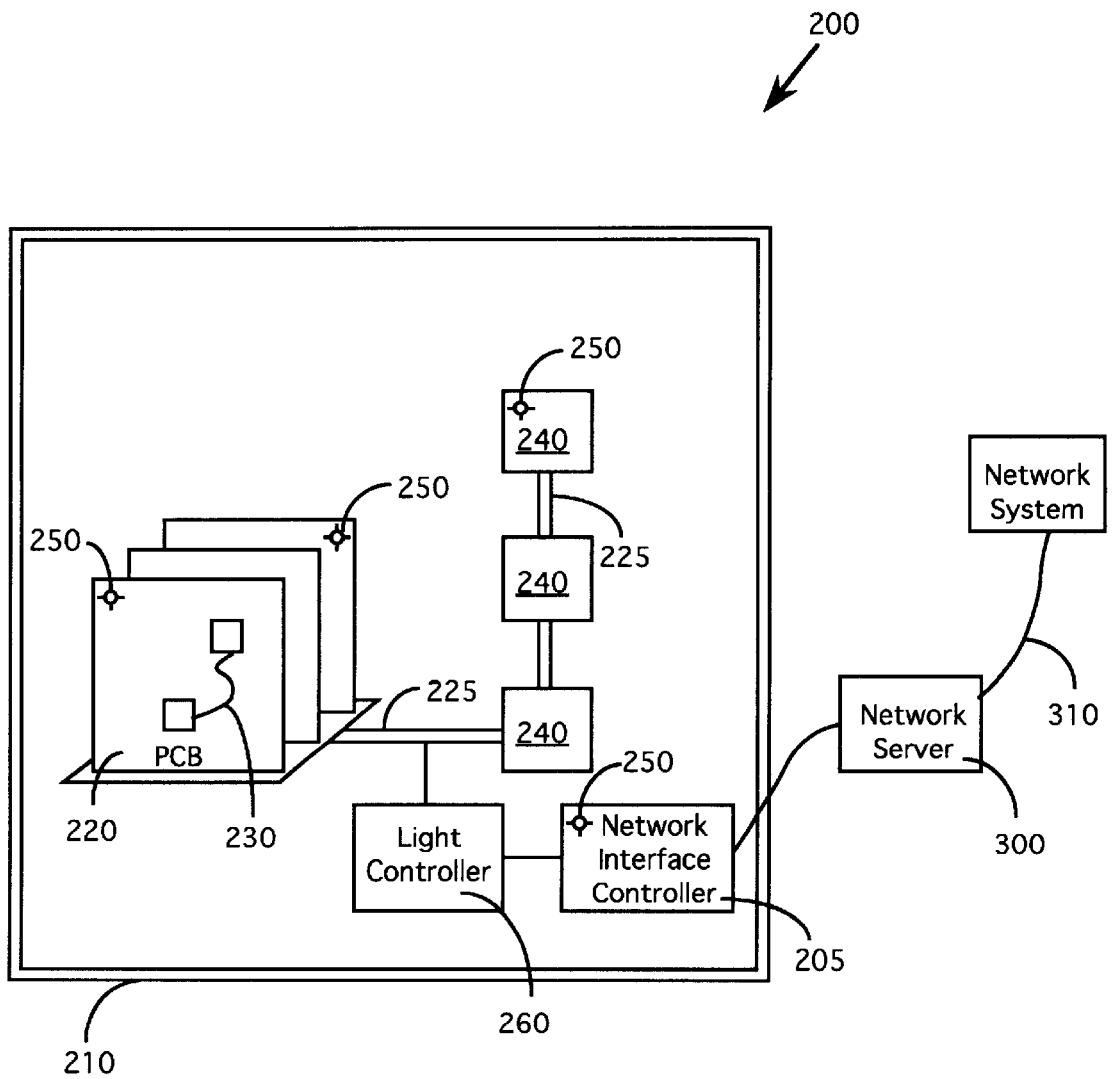
FIG. 2 is a functional block diagram showing the perspective view of a networked computer system that includes improved display configuration implemented with visible light indications of system operational conditions and function statuses through light transmissible housing cases.

FIG. 2 is a functional block diagram showing the perspective view of networked personal computer 200 enclosed in a light transmissible case 210 of this invention for providing an improved display configuration of operational conditions and function statuses. The networked computer is connected to a network via a network interface controller 205 to a network server 300 for sending and receiving data from the network 310. The networked computer 200 has a plurality of slots for inserting a plurality printed circuit boards 220 and data and signal buses 225 and electric wires 230 connected between circuit elements supported on the PCBs 220 and packaged electronic components 240. The personal computer 200 further includes a plurality of lights 250 connected to electric elements on the printed circuit board 220, the network interface controller 205, and to circuit elements of the packaged electric components 240. The lights 250 provide visible light emission as indications of the operational conditions or functional statuses of the personal computer 200 related to functions performed by the circuit elements supported on the PCB 220, the network interface controller 205, or packaged into the packaged electronic components 240. The indication lights 250 in this preferred embodiment may provide statuses and conditions of network data transmission and reception of the networked computer 200.

According to FIG. 2, a networked data handling system 200 is disclosed in this invention that has circuit elements enclosed in a light transmissible case 210. The networked data handling system further includes a visible light enclosed in the light-transmissible case 210 for providing indication of various functional statuses of the networked data handling system 200 through the light transmissible case. In a preferred embodiment, the networked data handling system includes a light control means 260 for controlling the visible light for providing a plurality of visible light signals for indicating various functional statuses of the networked data handling system. In a preferred embodiment, the light control means 260 further includes a light intensity control means for controlling an intensity of the visible light for indicating various functional statuses of the networked data handling system. In a preferred embodiment, the light control means 260 further includes a light flash-pattern control means for controlling a flash-pattern of the visible light for indicating various functional statuses of the networked data handling system. In a preferred embodiment, the light control means 260 further includes a color control means for controlling a color of the visible light for indicating various functional statuses of the networked data handling system. In another preferred embodiment, the networked data handling system further includes a printed circuit board (PCB) 220 for supporting the circuit elements enclosed in the light-transmissible case 210. And, the visible light is disposed on the PCB 220 for providing indication of various functional statuses of the networked data handling system through the light transmissible case. In another preferred embodiment, the networked data handling system further includes a packaged electronic component 240 enclosed in the light-transmissible case 210. And, the visible light is disposed on the packaged electronic component 240 for providing indication of various functional statuses of the networked data handling system through the light transmissible case. In another preferred embodiment, the networked data handling system 200 further includes a network means 205 for inputting signals to the visible light for providing a plurality of visible light signals for indicating various functional statuses of a network connected to the networked data handling system.

In addition to computer and networked data handling systems, e.g., computers interconnected with Internet, the display configuration as disclosed in this invention can be employed in various electronic devices. Different kinds of electronic devices, including but not limited to appliances or information appliances, Web-television sets, and other types of electronic devices, e.g. cellular phones, global position systems (GPS), and personal digital assistants (PDA), may be implemented with this new display configuration. This new display configuration is useful for enhancing system maintenance and repair operations. Additional information provided to a user of the electronic device through the visible lights further enhances the functionality and user friendliness for operating the electronic device.

According to the disclosure of this invention, a method for configuring a electronic device 100 having a plurality of circuit elements is disclosed in this invention. The method includes a step of a) enclosing the plurality of circuit elements in a light transmissible case 110; and b) providing a visible light 150 inside the light-transmissible case 110 for providing indication of various functional statuses of the electronic device 100 through the light transmissible case. In a preferred embodiment, the method further includes a step c) of providing a light control means 160 for controlling the visible light 150 for providing a plurality of visible light signals for indicating various functional statuses of the electronic device 100. In a preferred embodiment, the step of providing the light control means 160 further includes a step of providing a light intensity control means for controlling an intensity of the visible light for indicating various functional statuses of the electronic device 100. In another preferred embodiment, the step of providing the light control means 160 further includes a step of providing a light flash-pattern control means for controlling a flash-pattern of the visible light for indicating various functional statuses of the electronic device. In another preferred embodiment, the step of providing the light control means 160 further includes a step of providing a color control means for controlling a color of the visible light for indicating various functional statuses of the electronic device. In another preferred embodiment, the method further includes a step of d) providing a printed circuit board (PCB) 120 for supporting the circuit elements enclosed in the light-transmissible case. And e) disposing the visible light on the PCB for providing indication of various functional statuses of the electronic device through the light transmissible case. In another preferred embodiment, the method further includes a step of f) enclosing a packaged electronic component 140 in the light-transmissible case 110. And, disposing the visible light 150 on the packaged electronic component 140 for providing indication of various functional statuses of the electronic device through the light transmissible case.

The present invention therefore provides a novel display configuration for directly showing the operational conditions and functional statuses by visible signals transmitted from circuits on a board or components. Direct visible signals can provide additional information to aid in system diagnostic and repair operations or for upgrade and to perform upgrade or maintenance functions. Light transmissible housing cases are employed and indication lights are implemented to provide these functions such that the limitations and difficulties encountered in the prior art can be overcome. Specifically, a novel display configuration for is implemented for directly showing the board level and component operational conditions and functional statuses. Light transmissible cases are employed and indication light signals for showing conditions and statuses are implemented such that a user is provided with more direct information related to the situations of the entire system from board level and component level display. Also, a novel display configuration for directly showing the operational conditions and functional statuses of a networked computer is also disclosed. Light transmissible cases are employed and indication light signals for showing conditions and statuses of data transmission and reception are implemented such that a user is provided with more direct information related to the situations of the networked computers. Additionally, light transmissible cases are employed and indication light signals for showing conditions and statuses are disposed on circuit elements of the electronic device inside the light transmissible cases such that a user is provided with more direct information related to the situations of the electronic device. Light indications of operational conditions and functional statuses for commonly used electronic device can also be provided.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A personal computer having circuit elements disposed on a circuit support structure comprising:

a light transmissible case enclosing said circuit elements of said personal computer; and a visible light enclosed in said light-transmissible case disposed on said circuit support structure and electrically connected to said circuit elements for providing indication of various functional statuses of said personal computer related to said circuit elements whereby said indication is visible through said light transmissible case enclosing said circuit elements of said personal computer.

2. The personal computer of claim 1 further comprising:

a light control means for controlling said visible light disposed on said circuit support structure and electrically connected to said circuit elements for providing a plurality of visible light signals for indicating various functional statuses whereby said signals are visible through said light transmissible case enclosing said circuit elements of said personal computer.

3. The personal computer of claim 2 wherein:

said light control means further includes a light intensity control means for controlling an intensity of said visible light disposed on said circuit support structure and electrically connected to said circuit elements for indicating various functional statuses whereby said intensity is visible through said light transmissible case enclosing said circuit elements of said personal computer.

4. The personal computer of claim 2 wherein:
said light control means further includes a light flash-pattern control means for controlling a flash-pattern of said visible light disposed on said circuit support structure and electrically connected to said circuit elements for indicating various functional statuses whereby said flash-pattern is visible through said light transmissible case enclosing said circuit elements of said personal computer.

5. The personal computer of claim 2 wherein:
said light control means further includes a color control means for controlling a color of said visible light disposed on said circuit support structure and electrically connected to said circuit elements for indicating various functional statuses whereby said color is visible through said light transmissible case enclosing said circuit elements of said personal computer.

6. The personal computer of claim 1 wherein:
said circuit support structure further comprises a printed circuit board (PCB) for supporting said circuit elements enclosed in said light-transmissible case and said visible light is disposed on said PCB near and electrically connected to said circuit elements for providing indication of various functional statuses whereby said indication is visible through said light transmissible case enclosing said circuit elements of said personal computer.

7. The personal computer of claim 1 further comprising:
a packaged electronic component including said circuit elements enclosed in said light-transmissible case and said visible light is disposed on said packaged electronic component for providing indication of various functional statuses related to said packaged electronic component whereby said indication is visible through said light transmissible case enclosing said circuit elements of said personal computer.

8. An electronic device having circuit elements disposed on a circuit support structure further comprising:
a light transmissible case enclosing said circuit elements of said electronic device;
a visible light enclosed in said light-transmissible case disposed on said circuit support structure and electrically connected to said circuit elements for providing indication of various functional statuses of said electronic device related to said circuit elements whereby said indication is visible through said light transmissible case enclosing said circuit elements of said electronic device.

9. The electronic device of claim 8 further comprising:
a light control means for controlling said visible light disposed on said circuit support structure and electrically connected to said circuit elements for providing a plurality of visible light signals for indicating various functional statuses related to said circuit elements whereby said signals are visible through said light transmissible case enclosing said circuit elements of said electronic device.

10. The electronic device of claim 9 wherein:
said light control means further includes a light intensity control means for controlling an intensity of said visible light disposed on said circuit support structure and electrically connected to said circuit elements for indicating various functional statuses related to said circuit elements whereby said intensity is visible through said light transmissible case enclosing said circuit elements of said electronic device.

11. The electronic device of claim 9 wherein:
said light control means further includes a light flash-pattern control means for controlling a flash-pattern of said visible light disposed on said circuit support structure and electrically connected to said circuit elements for indicating various functional statuses related to said circuit elements whereby said flash-pattern is visible through said light transmissible case enclosing said circuit elements of said electronic device.

12. The electronic device of claim 9 wherein:
said light control means further includes a color control means for controlling a color of said visible light disposed on said circuit support structure and electrically connected to said circuit elements for indicating various functional statuses related to said circuit elements whereby said color is visible through said light transmissible case enclosing said circuit elements of said electronic device.

13. The electronic device of claim 8 wherein:
said circuit support structure further comprises a printed circuit board (PCB) for supporting said circuit elements enclosed in said light-transmissible case and said visible light is disposed on said PCB for providing an indication of various functional statuses related to said circuit elements whereby said indication is visible through said light transmissible case enclosing said circuit elements of said electronic device.

14. The electronic device of claim 8 further comprising:
a packaged electronic component including said circuit elements enclosed in said light-transmissible case and said visible light is disposed on said packaged electronic component for providing an indication of various functional statuses related to said circuit elements whereby said indication is visible through said light transmissible case enclosing said circuit elements of said electronic device.

15. A networked data handling system having circuit elements disposed on a circuit support structure further comprising:
a light transmissible case enclosing said circuit elements of said network data handling system; and
a visible light enclosed in said light-transmissible case disposed on said circuit support structure and connected to said circuit elements for providing indication of various functional statuses of said network data handling system related to said circuit elements whereby said indication is visible through said light transmissible case enclosing said circuit elements of said network data handling system.

16. The networked data handling system of claim 15 further comprising:
a light control means for controlling said visible light disposed on said circuit support structure and electrically connected to said circuit elements for providing a plurality of visible light signals for indicating various functional statuses related to said circuit elements whereby said signals are visible through said light transmissible case enclosing said circuit elements of said networked data handling system.

17. The networked data handling system of claim 16 wherein:
said light control means further includes a light intensity control means for controlling an intensity of said visible light disposed on said circuit support structure and electrically connected to said circuit elements for indicating various functional statuses related to said circuit elements whereby said intensity is visible through said light transmissible case enclosing said circuit elements of said networked data handling system.

18. The networked data handling system of claim 16 wherein:
said light control means further includes a light flash-pattern control means for controlling a flash-pattern of said visible light disposed on said circuit support structure and electrically connected to said circuit elements for indicating various functional statuses related to said circuit elements whereby said flash-pattern is visible through said light transmissible case enclosing said circuit elements of said networked data handling system.

19. The networked data handling system of claim 16 wherein:
said light control means further includes a color control means for controlling a color of said visible light disposed on said circuit support structure and electrically connected to said circuit elements for indicating various functional statuses related to said circuit elements whereby said color is visible through said light transmissible case enclosing said circuit elements of said networked data handling system.

20. The networked data handling system of claim 15 wherein:
said circuit support structure further comprising a printed circuit board (PCB) for supporting said circuit elements enclosed in said light-transmissible case and said visible light is disposed on said PCB for providing an indication of various functional statuses related to said circuit elements whereby said indication is visible through said light transmissible case enclosing said circuit elements of said networked data handling system.

21. The networked data handling system of claim 15 further comprising:
a packaged electronic component including said circuit elements enclosed in said light-transmissible case and said visible light is disposed on said packaged electronic component for providing an indication of various functional statuses related to said circuit elements whereby said indication is visible through said light transmissible case enclosing said circuit elements of said networked data handling system.

22. The networked data handling system of claim 15 further comprising:
a network means for inputting signals to said visible light disposed on said circuit support structure and connected to said circuit elements for providing a plurality of visible light signals for indicating various functional statuses of a network connected to said networked data handling system whereby said signals are visible through said light transmissible case enclosing said circuit elements of said networked data handling system.

23. A method for configuring a personal computer having a plurality of circuit elements disposed on a circuit support structure comprising:
a) enclosing said plurality of circuit elements in a light transmissible case; and
b) disposing a visible light inside said light-transmissible case on said circuit support structure for connecting to said circuit elements for providing an indication of various functional statuses of said personal computer related to said circuit elements whereby said indication is visible through said light transmissible case enclosing said circuit elements of said personal computer.

24. The method of claim 23 further comprising:
c) providing a light control means for controlling said visible light disposed on said circuit support structure for providing a plurality of visible light signals for indicating various functional statuses related to said circuit elements whereby said signals are visible through said light-transmissible case enclosing said circuit elements of said personal computer.

25. The method of claim 23 wherein:
said step of providing said light control means further includes a step of providing a light intensity control means for controlling an intensity of said visible light disposed on said circuit support structure for indicating various functional statuses related to said circuit elements whereby said intensity is visible through said light-transmissible case enclosing said circuit elements of said personal computer.

26. The method of claim 23 wherein:
said step of providing said light control means further includes a step of providing a light flash-pattern control means for controlling a flash-pattern of said visible light disposed on said circuit support structure for indicating various functional statuses related to said circuit elements whereby said flash pattern is visible through said light-transmissible case enclosing said circuit elements of said personal computer.

27. The method of claim 23 wherein:
said step of providing said light control means further includes a step of providing a color control means for controlling a color of said visible light disposed on said circuit support structure for indicating various functional statuses related to said circuit elements whereby said color is visible through said light-transmissible case enclosing said circuit elements of said personal computer.

28. The method of claim 23 further comprising:
providing a printed circuit board (PCB) for disposing and supporting said circuit elements enclosed in said light-transmissible case and disposing said visible light on said PCB for providing an indication of various functional statuses related to said circuit elements whereby said indication is visible through said light-transmissible case enclosing said circuit elements of said personal computer.

29. The method of claim 23 further comprising:
packaging said circuit elements as a packaged electronic component and enclosing said electronic component in said light-transmissible case and disposing said visible light on said packaged electronic component for providing an indication of various functional statuses related to said circuit elements whereby said indication is visible through said light-transmissible case enclosing said circuit elements of said personal computer.

30. A method for configuring a electronic device having a plurality of circuit elements disposed on a circuit support structure comprising:
a) enclosing said plurality of circuit elements in a light transmissible case; and
b) disposing a visible light inside said light-transmissible case on said circuit support structure and connecting to said circuit elements for providing an indication of various functional statuses of said electronic device related to said circuit elements whereby said indication is visible through said light transmissible case enclosing said circuit elements of said electronic device.

31. The method of claim 30 further comprising:

c) providing a light control means for controlling said visible light disposed on said circuit support structure for providing a plurality of visible light signals for indicating various functional statuses related to said circuit elements whereby said signals are visible through said light-transmissible case enclosing said circuit elements of said electronic device.

32. The method of claim 31 wherein:

said step of providing said light control means further includes a step of providing a light intensity control means for controlling an intensity of said visible light disposed on said circuit support structure for indicating various functional statuses related to said circuit elements whereby said intensity is visible through said light-transmissible case enclosing said circuit elements of said electronic device.

33. The method of claim 31 wherein:

said step of providing said light control means further includes a step of providing a light flash-pattern control means for controlling a flash-pattern of said visible light disposed on said circuit support structure for indicating various functional statuses related to said circuit elements whereby said flash-pattern is visible through said light-transmissible case enclosing said circuit elements of said electronic device.

34. The method of claim 31 wherein:

said step of providing said light control means further includes a step of providing a color control means for controlling a color of said visible light disposed on said circuit support structure for indicating various functional statuses related to said circuit elements whereby said color is visible through said light-transmissible case enclosing said circuit elements of said electronic device.

35. The method of claim 30 further comprising:

providing a printed circuit board (PCB) for disposing and supporting said circuit elements enclosed in said light-transmissible case and disposing said visible light on said PCB for providing an indication of various functional statuses related to said circuit elements whereby said indication is visible through said light-transmissible case enclosing said circuit elements of said electronic device.

36. The method of claim 30 further comprising:

packaging said circuit elements as a packaged electronic component and enclosing said packaged electronic component in said light-transmissible case and disposing said visible light on said packaged electronic component for providing an indication of various functional statuses related to said circuit elements whereby said indication is visible through said light-transmissible case enclosing said circuit elements of said electronic device.

* * * * *